No. 693,008. Patented Feb. 11, 1902.
L. G. HARRIS.
METHOD OF MANUFACTURING GAS.
(Application filed Mar. 7, 1901.)
(No Model.)
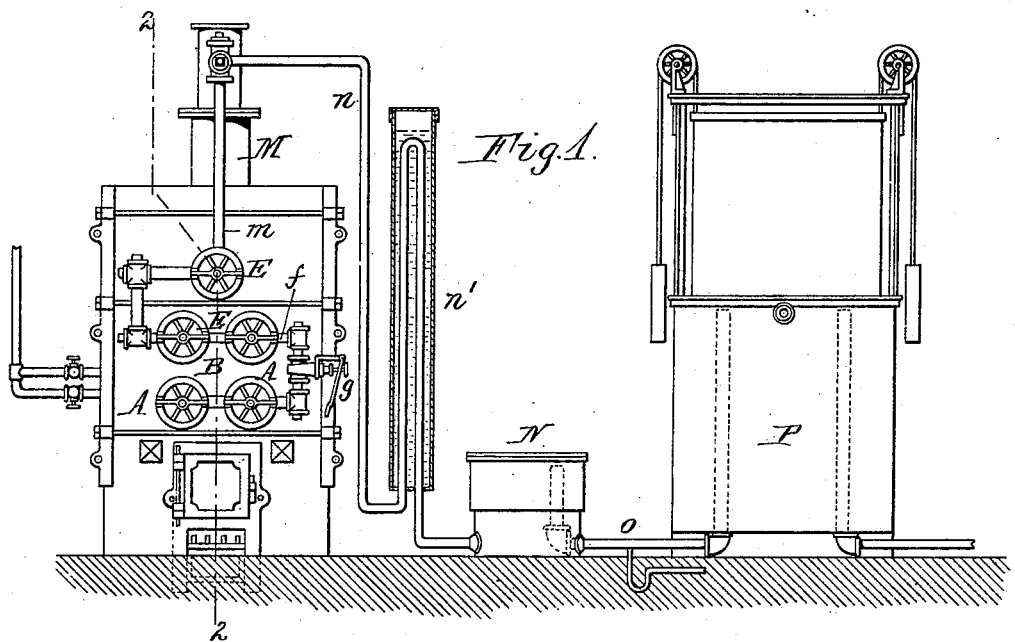
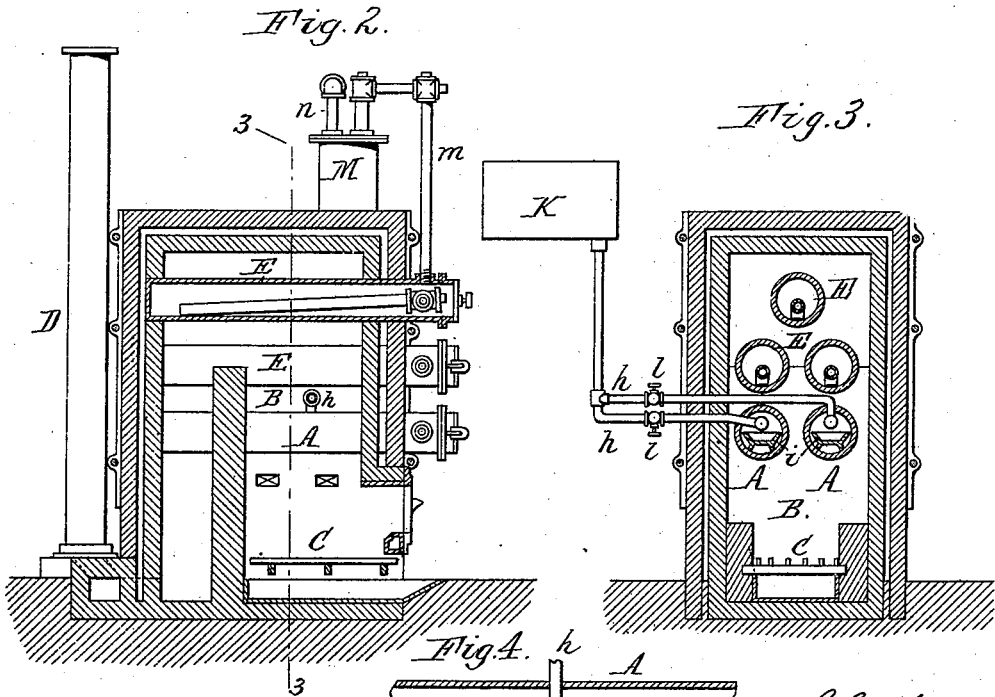
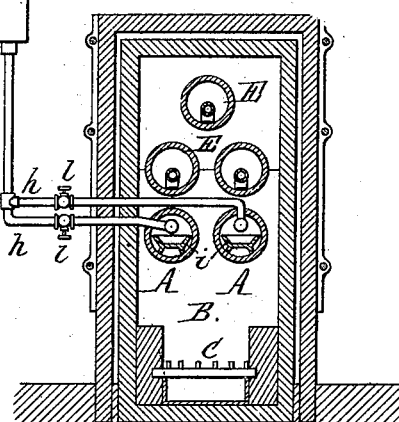
Witnesses:
Henry L. Deck
F. F. Scheyinger
L. G. Harris
Inventor.
By Wilhelm Bonner
Attorneys.

UNITED STATES PATENT OFFICE.

LOUIS G. HARRIS, OF EAST ORANGE, NEW JERSEY.

METHOD OF MANUFACTURING GAS.

SPECIFICATION forming part of Letters Patent No. 693,008, dated February 11, 1902.

Application filed March 7, 1901. Serial No. 50,171. (No specimens.)

*To all whom it may concern:*

Be it known that I, LOUIS G. HARRIS, a subject of the King of Great Britain, and a resident of East Orange, in the county of Essex and State of New Jersey, have invented a new and useful Improvement in the Manufacture of Gas, of which the following is a specification.

The object of this invention is to produce in a simple, direct, and inexpensive way a combustible gas which is suitable for use as fuel and also as illuminating-gas and which is free from objectionable ingredients.

In practicing my invention according to the best method known to me I proceed as follows: I prepare a mixture of fifty gallons of water, fifteen gallons of mineral oil—for instance, the petroleum derivative known as "gas-oil"—five pounds of caustic potash, four pounds of nitrate of soda, two pounds of common salt, and three pounds of slaked lime. These ingredients are thoroughly mixed under agitation, so as to produce a homogeneous mixture. This liquid mixture is then distilled in a suitable retort and the resulting gas and vapor are passed through a superheater, in which the gas becomes fixed. The gas is then purified in any ordinary manner. The distillation can be carried on at a comparatively low temperature, varying from 1,300° to 1,500° Fahrenheit, and the temperature which is required for superheating is correspondingly low. The gas produced in this manner is comparatively pure. It contains but little, if any, carbon monoxid and it has a high candle-power.

The above-stated quantities and proportions are given only approximately and as illustrative and may be varied more or less as circumstances may require. Some of the ingredients may be omitted. For instance, only a single alkaline ingredient, such as caustic potash, may be used in connection with water and mineral oil; but I prefer to use all of the ingredients named, as they give the best results. The caustic potash causes the distillation to proceed satisfactorily at a comparatively low temperature, and when poor or heavy grades of oil are used the caustic potash greatly facilitates the distillation of the oil and the production of gas therefrom and increases the volume of gas which is produced. The lime and salt purify the gas by eliminating carbon monoxid and other objectionable compounds and greatly assist in emulsifying the water and oil in preparing the liquid mixture. The nitrate of soda increases the brilliancy and heating value of the gas.

In the accompanying drawings, which illustrate an apparatus suitable for practicing my invention, Figure 1 is a front elevation of the apparatus. Fig. 2 is a vertical longitudinal section through the distilling and superheating apparatus on line 2 2, Fig. 1. Fig. 3 is a vertical transverse section on line 3 3, Fig. 2. Fig. 4 is a fragmentary longitudinal section of one of the distilling-retorts on an enlarged scale.

Like letters of reference refer to like parts in the several figures.

A A represent two distilling-retorts arranged side by side in a heating-chamber B, having a fireplace C and a smoke-stack D, all constructed in any suitable manner. E represents several superheating-retorts arranged in the same heating-chamber above the distilling-retorts and receiving the gas therefrom through a pipe $f$, provided with a stopcock $g$.

$h$ represents pipes through which the liquid gas-producing mixture is supplied to the distilling-retorts. One of these pipes enters each of these retorts and terminates in the same in a perforated pipe or in any suitable nozzle, by which the liquid is delivered into a pan $i$, arranged in the retort. The pipes $h$ connect with a reservoir K, which contains the liquid mixture, and are provided with stopcocks $l$, by which the supply of liquid to each retort can be regulated.

The gases and vapors generated in the distilling-retorts pass successively through the superheating-retorts, of which three are shown, and pass from the highest of these retorts by a pipe $m$ to a tar-receiver M, from the latter by a pipe $n$ through a condenser $n'$ to a purifier N, and from the latter by a pipe O to a gas-holder P.

The liquid gas-producing mixture is supplied to each distilling-retort in a practically continuous stream—that is to say, the supply is so regulated that the liquid is distilled about as fast as it is received in the retort, whereby a practically continuous operation of the apparatus is secured. If desired, however, the liquid may be charged into the retort in a quantity at a time and then be distilled off.

The apparatus above described is well adapted for practicing my invention; but I do not wish to limit myself to an apparatus of any specific or particular construction.

I claim as my invention—

1. The herein-described method of manufacturing a combustible gas which consists in preparing a mixture of mineral oil, a quantity of water greatly in excess of the mineral oil, and an alkaline ingredient, distilling the mixture, and superheating the resulting gas and vapor, substantially as set forth.

2. The herein-described method of manufacturing a combustible gas which consists in preparing a mixture of mineral oil, a quantity of water in excess of the mineral oil, potash, salt, slaked lime and nitrate of soda, distilling the mixture, and superheating the resulting gas and vapor, substantially as set forth.

3. The herein-described method of manufacturing a combustible gas which consists in mixing substantially fifty gallons of water, substantially fifteen gallons of mineral oil, and an alkaline ingredient, distilling the mixture and superheating the resulting gas and vapor, substantially as set forth.

Witness my hand this 4th day of March, 1901.

LOUIS G. HARRIS.

Witnesses:
FRANK H. TAYLOR,
LOUIS W. GELLMYER.